(12) United States Patent
Soares et al.

(10) Patent No.: US 11,959,681 B2
(45) Date of Patent: Apr. 16, 2024

(54) SYSTEM AND METHOD FOR OPERATIONAL ACOUSTIC OPTIMIZATION OF A VARIABLE SPEED COMPRESSOR AND REFRIGERATOR

(71) Applicant: NIDEC GLOBAL APPLIANCE BRASIL LTDA., Joinville-SC (BR)

(72) Inventors: Claudio Eduardo Soares, Joinville-SC (BR); Edson Correa Miguel, Joinville-SC (BR); Gabriel Decker Do Santos, Joinville-SC (BR)

(73) Assignee: NIDEC GLOBAL APPLIANCE BRASIL LTDA., Joinville-SC (BR)

( * ) Notice: Subject to any disclaimer, the term of this patent is extended or adjusted under 35 U.S.C. 154(b) by 167 days.

(21) Appl. No.: 17/619,854

(22) PCT Filed: Jun. 17, 2020

(86) PCT No.: PCT/BR2020/050215
§ 371 (c)(1),
(2) Date: Dec. 16, 2021

(87) PCT Pub. No.: WO2020/252549
PCT Pub. Date: Dec. 24, 2020

(65) Prior Publication Data
US 2022/0349636 A1    Nov. 3, 2022

(30) Foreign Application Priority Data

Jun. 17, 2019    (BR) .................. 10 2019 012477 6

(51) Int. Cl.
*F25B 49/02* (2006.01)
*F25B 1/02* (2006.01)
(Continued)

(52) U.S. Cl.
CPC .............. *F25B 49/022* (2013.01); *F25B 1/02* (2013.01); *F25B 31/023* (2013.01);
(Continued)

(58) Field of Classification Search
CPC .......................... F25B 49/022; F25B 49/025; F25B 2600/021; F25B 2600/0253; F04B 35/04;
(Continued)

(56) References Cited

U.S. PATENT DOCUMENTS

2009/0195198 A1    8/2009    Lee
2013/0015786 A1    1/2013    Sakae et al.
(Continued)

FOREIGN PATENT DOCUMENTS

EP    1 505 303 A1    2/2005
EP    3 382 873 A2    10/2018

OTHER PUBLICATIONS

International Search Report issued in PCT Application No. PCT/BR2020/050215, dated Dec. 1, 2020.

*Primary Examiner* — Jonathan Bradford
(74) *Attorney, Agent, or Firm* — FOLEY & LARDNER LLP (57) ABSTRACT

A system for operational acoustic optimization of a variable speed compressor (2) includes a motor (6), a frequency inverter (3), and a control block (5). The frequency inverter (3) is electrically connected to the synchronous motor (6), an electrical network (4), and the control block (5). The control block (5) is configured to control the speed of the motor (6) and to establish a first switching frequency (F1) and a second switching frequency (F2) of the frequency inverter (3). The frequency inverter (3) is configured to start the variable speed compressor (2) by supplying motor (6) with a signal (9) with the first switching frequency (F1) for the duration of a time period (T1) corresponding to at least one alignment (Continued)

operation period of the motor (6) and to supply the motor (6) with a signal (9) with the second switching frequency (F2) after the time period (T1).

12 Claims, 6 Drawing Sheets

(51) Int. Cl.
*F25B 31/02* (2006.01)
*H02P 27/08* (2006.01)
*F04B 35/04* (2006.01)

(52) U.S. Cl.
CPC .......... *F25B 49/025* (2013.01); *H02P 27/085* (2013.01); *F04B 35/04* (2013.01); *F04B 2203/0204* (2013.01); *F04C 2270/135* (2013.01); *F25B 2600/021* (2013.01); *F25B 2600/0253* (2013.01)

(58) Field of Classification Search
CPC ........ F04B 2203/0204; F04C 2270/135; H02P 27/082
See application file for complete search history.

(56) References Cited

U.S. PATENT DOCUMENTS

| | | |
|---|---|---|
| 2016/0226426 A1* | 8/2016 | Lee ....................... D06F 37/304 |
| 2017/0070170 A1 | 3/2017 | Emde et al. |
| 2017/0129428 A1 | 5/2017 | Isoda et al. |
| 2018/0102723 A1* | 4/2018 | Kawashima ............ H02P 21/22 |

\* cited by examiner

SYSTEM AND METHOD FOR OPERATIONAL ACOUSTIC OPTIMIZATION OF A VARIABLE SPEED COMPRESSOR AND REFRIGERATOR

CROSS-REFERENCE TO RELATED APPLICATIONS

This application is the U.S. National Stage of PCT Application No. PCT/BR2020/050215, filed on Jun. 17, 2020, which claims priority to Brazilian Application No. BR 10 2019 012477 6, filed on Jun. 17, 2019.

The present invention relates to a system and method for operational acoustic optimization of a variable speed compressor.

DESCRIPTION OF THE PRIOR ART

Variable speed compressors are devices widely used and extremely present in several systems and devices used worldwide.

In a simplified way, a variable speed compressor comprises an electric motor, generally a synchronous motor; for efficiency reasons, such a motor can be started using a frequency inverter, as already known in the prior art.

In operation, the frequency converter controls the voltage applied to the motor through a switched signal, such a switched signal being constituted by multiple voltage pulses at a given frequency, also known as switching frequency. The definition of the switching frequency is directly related to the motor efficiency, the thermal management of the frequency inverter, and acoustic performance.

However, during the motor operation, the emission of noise from different sources is quite common, such as, for example, mechanical noises, refrigerant fluid flow noises, noises from the action of electromagnetic forces on mechanical devices, etc.

One of these sources that generate mechanical noise due to electromagnetic forces is the switching frequency of the power supply of the motor. This occurs because the frequency of the switched signal used to supply the motor is in the range of frequencies sensitive to human hearing, that is, in the range of 20 Hz to 20 kHz.

Further, in order to obtain an acceptable operating performance and guarantee the thermal management of the inverter, the switching frequency of the power supply of the motor is calculated in order to meet these criteria, which frequency is usually in the above-mentioned range.

In any case, there is a need to reduce the noise generated by the operation of the compressors, since such noises create discomfort for those around it.

EP 1505303 discloses a method for reducing noise on a machine set which has at least one frequency converter. According to such method, it is first determined whether the noise level caused by the machine set exceeds a preset or a presettable noise level. Alternatively or additionally, the present of people in the vicinity of the machine set is selected by means of appropriate sensors.

However, the noise generated by the switching frequency of the power supply of the motor is more noticeable during the first moments of compressor operation, hereinafter referred to as the alignment phase of the motor. This occurs because, in the first moments of the motor operation, all other noise sources are absent, except the noise generated by the switching frequency of the power supply signal of the motor. In this case, the noise generated by the switching frequency is characterized as a tonal noise, that is, sounds whose results of its frequency analysis, with a bandwidth of ⅓ octave, it presents a frequency with a level at least 5 dB (A) higher than the level of the adjacent frequency bands. A noise with tonal components is, in general, more annoying than another noise that lacks these characteristics.

Thus, in order to minimize the tonal noise generated in such an alignment phase, resulting in a decrease in the perceptible sound generated at such a time, the present invention provides means to achieve such a solution, as will be explained below.

Objectives of the Invention

The first objective of the present invention resides in the provision of a system for operational acoustic optimization of a variable speed compressor.

A second objective of the present invention resides in the provision of a method for operational acoustic optimization of a variable speed compressor.

A third objective of the present invention resides in the provision of the refrigerator that comprises a system for acoustic optimization as will be described below.

BRIEF DESCRIPTION OF THE INVENTION

The objectives of the present invention are achieved through a system for operational acoustic optimization of a variable speed compressor, such a system comprising a variable speed compressor comprising a synchronous motor, a frequency inverter and a control block, the frequency inverter being electrically connected to the synchronous motor and an electrical network; the control block being electrically connected to the frequency inverter and being configured to perform the synchronous motor speed control comprised in the variable speed compressor, the control being further configured to establish a first switching frequency and a second switching frequency of the frequency inverter to power supply the synchronous motor with a power supply signal; the control block being further configured to establish a time period in which the synchronous motor will be powered by the frequency inverter signal with the first switching frequency, wherein the time period corresponds to at least one alignment operation period of the motor, the frequency inverter being further configured to power supply the motor with a signal with the second switching frequency after the time period.

Additionally, the objectives of the present invention are achieved through a method for operational acoustic optimization of a variable speed compressor that comprises a synchronous motor, the compressor being electrically associated with a frequency inverter and a control block, the method comprising the steps of:
 (a) establishing a first switching frequency;
 (b) establishing a second switching frequency;
 (c) establishing a time period, which corresponds to the duration of an alignment operation of the synchronous motor;
 (d) supplying the synchronous motor with a signal with the first switching frequency established in step (a), during the time period established in step (c); and
 (e) after the time period established in step (c), supply the synchronous motor with a signal with the second switching frequency established in step (b).

Finally, the objectives of the present invention are achieved through a refrigerator that comprises a system for operational acoustic optimization of a variable speed compressor as defined above.

BRIEF DESCRIPTION OF DRAWINGS

The present invention will be described in more detail below based on an example of execution shown in the drawings. The Figures shows.

DETAILED DESCRIPTION OF THE FIGURES

The present invention provides means to reduce the acoustic noise generated during the first operational moments of a variable speed compressor 2, that is, during the so-called alignment phase of the motor 6. In such an alignment phase of the motor 6, at least an operation called the alignment operation of the motor 6, in which a supply signal 9, with a specific switching frequency, supplies the synchronous motor 6 for a time period T1, such period T1 is, therefore, an alignment operation period of the motor 6.

Such an alignment operation period of the motor 6 results in the alignment of the synchronous motor 6 to the magnetic field generated by the supply signal 9, which allows the subsequent operation of the synchronous motor 6 in its normal operation, that is, operation in a closed loop. This occurs because the power supply signal 9 consequently generates a magnetic field, which induces the synchronous motor 6 to align with such field since the rotor of the synchronous motor 6 is made of magnetic materials.

Therefore, after the alignment phase of the motor 6, it is observed that the synchronous motor 6 is electrically aligned to the magnetic field generated by the power supply signal 9. Consequently, the alignment phase of the motor 6 allows the mechanical position of the motor 6 to be determined as well.

The determination of the mechanical position of the aforementioned motor 6 is advantageous, for example, in applications related to the use of the motor 6 with compressors, since in such applications, it is desired to determine the mechanical position of a piston that may come to compose a compression system.

In other words, the alignment phase of the motor 6 results in two desired situations. The first refers to the determination of the electrical alignment of the motor 6, in order to enable the correct power supply of the motor and its operation in a closed loop. The second, on the other hand, refers to the mechanical alignment of the motor 6 and, consequently, the determination of the mechanical position of a piston that can comprise a compression system attached to the motor 6.

During the alignment phase of the motor 6, the noise generated by the switching frequency of the power supply of the motor 6 stands out for being characterized as a tonal noise 1 since there are no other sources of noise, once the motor is stopped.

Figure 1:
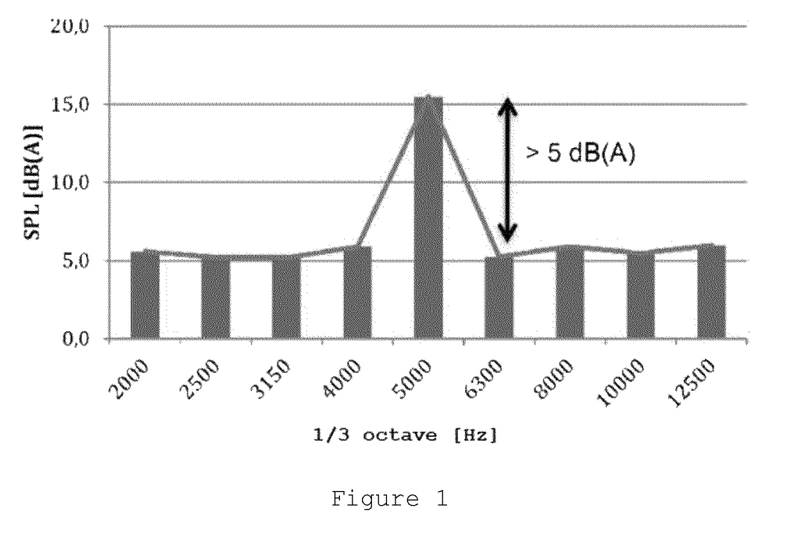
FIG. 1—is a representative graph that illustrates a tonal, in a graph of bandwidth frequencies of ⅓ octave.

As previously mentioned and illustrated by FIG. 1, the tonal noise is a sound, whose result of its frequency analysis, with a bandwidth of ⅓ octave, presents a frequency with a level of at least 5 dB (A) higher than the level of the adjacent frequency bands.

Figure 2:
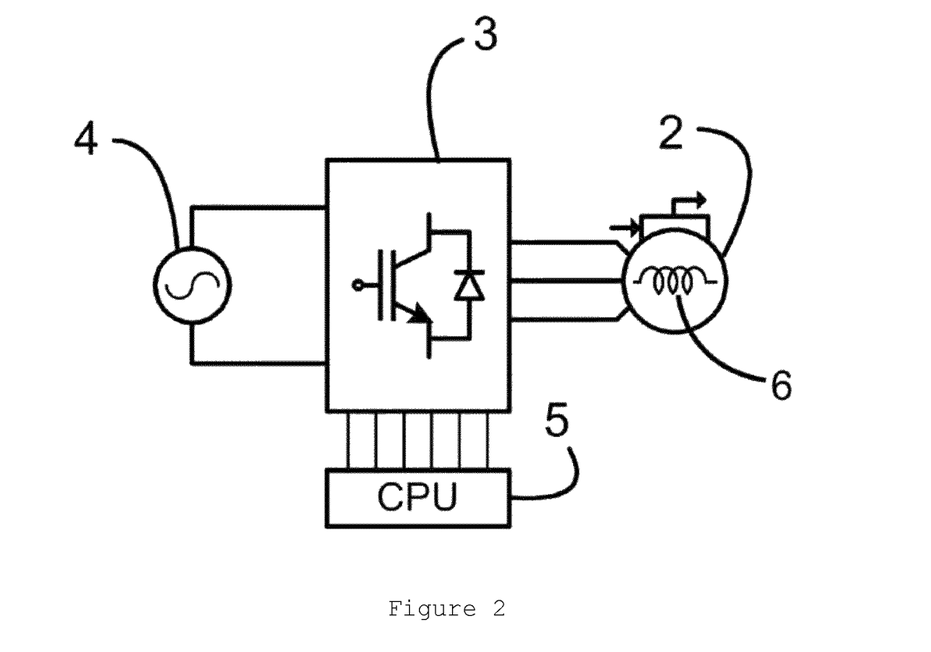
FIG. 2—illustrates a system that comprises a frequency inverter connected to the electrical network, associated with a control block and a variable speed compressor that includes a synchronous motor.

Referring to FIG. 2, and in a simplified way, the variable speed compressor 2, which comprises a synchronous motor 6, is electrically associated with a frequency inverter 3, said frequency inverter 3 being connected to the electrical network 4 and a control block 5.

Figure 3:
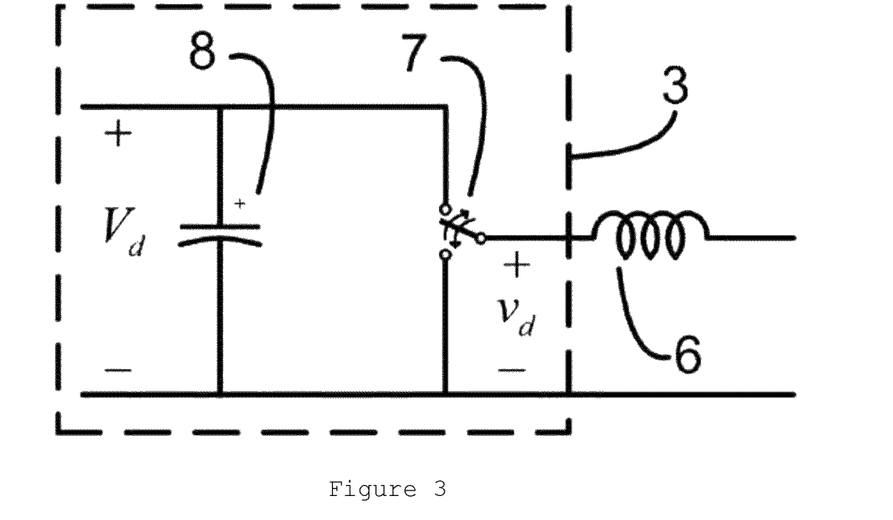
FIG. 3—illustrates a possible embodiment of the frequency inverter associated with the synchronous motor of the variable speed compressor.
Figure 4:
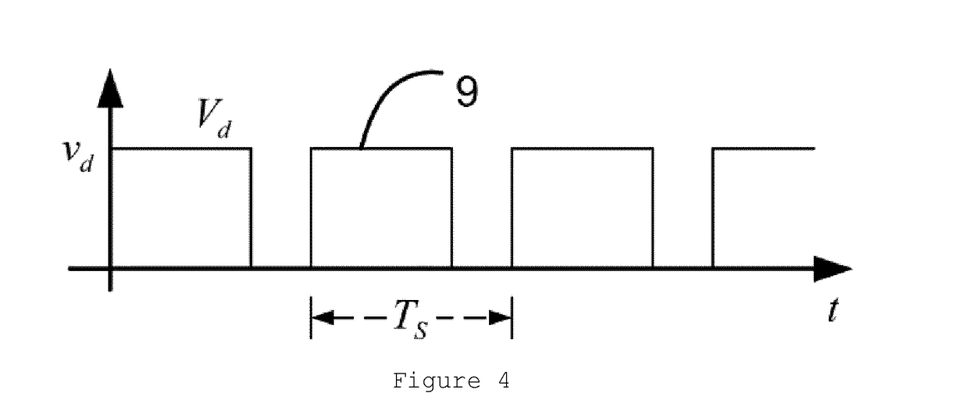
FIG. 4—illustrates a possible implementation of the power supply signal of the synchronous motor, resulting from the operation of the frequency inverter.

During the operation of the compressor 2, the frequency inverter 3 is responsible for supplying the motor 6 of the compressor 2, from an intermediate source of direct current 8, with a switched signal 7 with a defined frequency, similarly to an alternating pulse 9, as shown in FIGS. 3 and 4.

Control block 5 is responsible for controlling the rotation speed of the motor 6 of the compressor 2, acting as a control system as widely used and known from the prior art.

Figure 5:
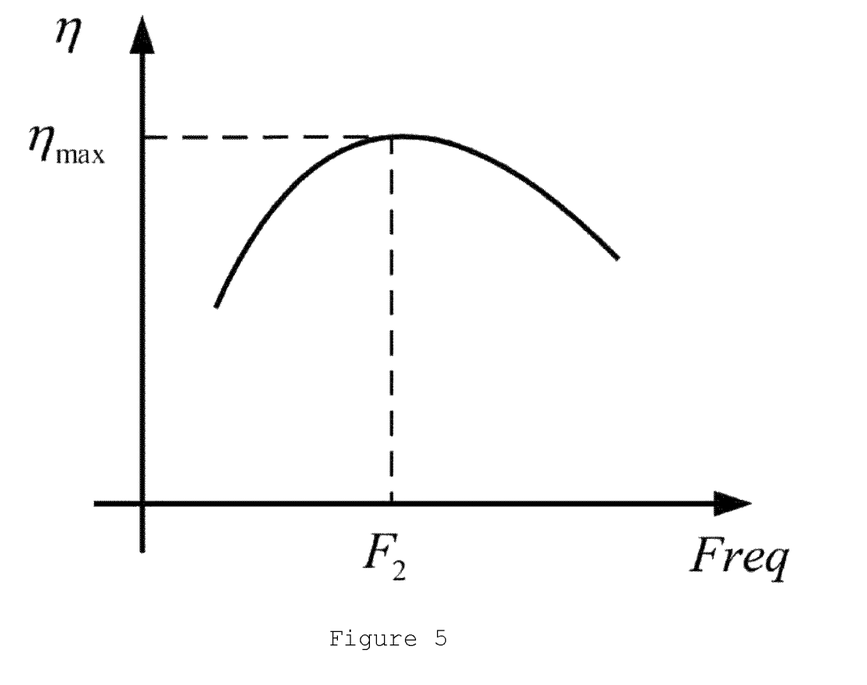
FIG. 5—is a representative graph, showing the performance curve of a synchronous motor as a function of the frequency of the power supply signal of the motor.

Usually, a switching frequency of the power supply signal 9 of the motor 6 is defined after the alignment phase of the motor 6, in order to obtain the optimum performance of the compressor 2, as shown in FIG. 5. However, due to this criterion, this switching frequency used to supply the motor 6 ends up being in the human audible frequency range, that is, between 20 Hz and 20 kHz.

Thus, in order to solve the problem related to the noise generated in the alignment phase of the motor 6 of the compressor 2, the present invention provides a system and a method wherein the switching frequency of the power supply signal 9 of the motor 6 of the compressor 2 is changed only during the alignment phase of the motor.

Figure 6:
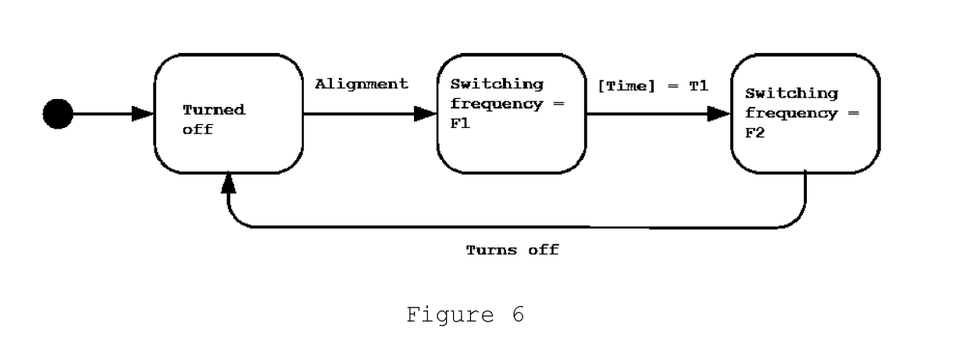
FIG. 6—is a simplified diagram of the compressor operating steps, illustrating the frequency modification of the power supply signal of the synchronous motor in relation to a time established after the alignment operation of the motor.

In this scenario, and according to a preferential embodiment of the present invention, the control block 5, associated with the frequency inverter 3 and the compressor 2, is also configured to establish at least two switching frequencies (F1, F2), as shown in FIG. 6.

A first switching frequency F1 established by the control block 5 is the frequency of the power supply signal 9 during the alignment phase of the motor 6.

A second switching frequency F2 established by the control block 5 will be the frequency of the power supply signal 9 that supplies the motor 6 of the compressor 2 after the alignment phase of the motor 6.

Additionally, and still referring to FIG. 6, the control block 5 must be configured to establish a time period T1 in which the frequency inverter 3 must send the signal 9 with the first switching frequency F1 established by the control block 5. This time period T1 corresponds to the duration of the alignment phase of the 6, therefore, corresponding to an alignment operation time of the motor 6. Immediately after this time period T1, the control block 5 must indicate the change of frequency to the frequency inverter 3 so that the motor 6 of the compressor 2 is then fed with a signal 9 with the second switching frequency F2, established by the control block 5.

However, the above description should not be understood as a limitation of the present invention, so that the alignment phase of the motor 6 can comprise several alignment operations of the motor 6. That is, the time period T1 in which the alignment operation of the motor 6 can be repeated multiple times.

Such repetition may occur due to the mechanical alignment of the motor 6 to the magnetic field generated by the power supply signal 9, as previously mentioned. The determination of the mechanical position of the motor 6 can be achieved both through a single alignment operation, as well as through several alignment operations, as mentioned above since it is desired to achieve both the electrical alignment and the mechanical alignment of the motor 6.

In other words, the alignment phase of the motor 6 can comprise several alignment operations of the motor 6, in order to make it possible to obtain both the electrical alignment and the mechanical alignment of the motor 6.

According to a preferential embodiment of the invention, the first switching frequency F1 must be higher than the second switching frequency F2. Preferably, the second switching frequency F2 is defined in order to obtain the optimum operating efficiency of the compressor. In this sense, and only preferentially, the second switching frequency F2 has a value between 20 Hz and 20 kHz, more preferably, it has a value of 5 kHz.

Figure 7:
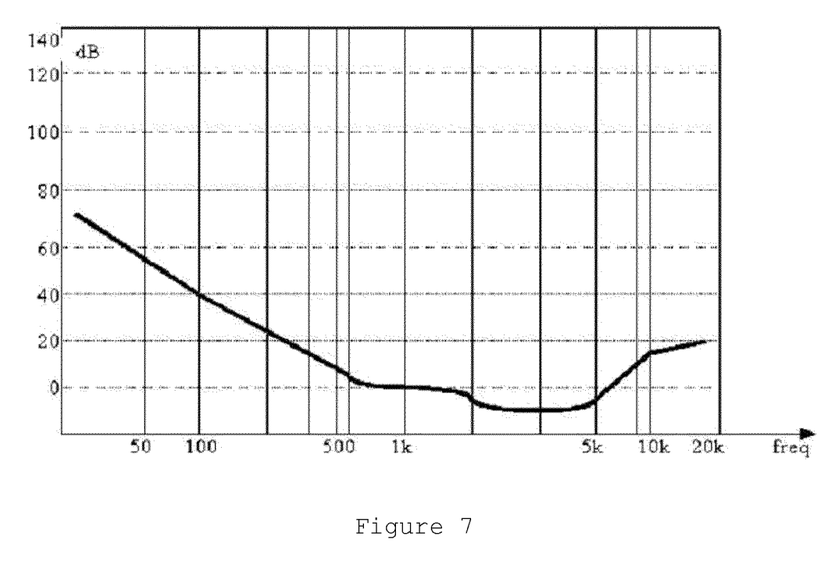
FIG. 7—illustrates a graph representing the hearing thresholds of the human ear, indicating the minimum intensity required in dB for a frequency to be perceived.

Referring to FIG. 7, a graph representing the hearing thresholds of the human ear is illustrated, indicating the minimum necessary intensity, in dB, for a frequency to be perceived. Generally speaking, the greatest auditory sensitivity occurs between the frequencies of 2 kHz and 5 kHz, so that there is a significant loss of sensitivity as it progresses in relation to both ends of the audible frequency band. In particular, after the frequency of 12 kHz, the hearing sensitivity of the human ear is significantly reduced.

As previously mentioned, the first switching frequency F1 must be higher than the second switching frequency F2, so that it is barely perceptible, or totally imperceptible, to the human ears. In this scenario, and still referring to FIG. 6, the first switching frequency F1 can be higher than 20 kHz.

However, as shown in FIG. 7, and in accordance with the information described above, the sensitivity of the human ear is significantly reduced at frequencies above 12 kHz. Thus, when it is not technically possible to establish a first switching frequency F1 of 20 kHz, establishing the first switching frequency F1 at 12 kHz is sufficient to achieve the objectives of the present invention, that is, to significantly reduce noise generated during the alignment phase of the motor 6.

Therefore, in a preferential embodiment, the first switching frequency F1 should preferably be higher than 12 kHz. Most preferably, the first switching frequency F1 should be higher than 20 kHz.

Given the preferential configuration exposed above, it is understood that the first switching frequency F1 is located, preferably, in a non-audible region of the frequency spectrum (ultrasound) or, even more preferably, in the region barely perceptible by the human ear, according to the definition of audibility thresholds illustrated in FIG. 7. Thus, the power supply signal 9 of the motor 2 of the compressor 3, when it has such a first switching frequency F1, will not have a perceptible sound volume or at least will be practically imperceptible to the human ear.

In this sense, and according to the aforementioned preferential embodiment, the control block 5 is configured to establish the time period T1, in which, immediately after such time period T1, the frequency of the power supply signal 9 of the motor 6 is modified. This moment must be understood as the moment after the end of the alignment phase of the motor 6, that is, when the motor 6 starts to turn, operating in a closed loop.

In other words, the time period T1 indicates the length of time for which the motor 6 will be fed with a signal 9 with the first switching frequency F1. Therefore, immediately after the time period T1, and therefore, after the alignment phase of the motor 6, it will be fed with a signal 9 with the second switching frequency F2.

In addition, and in harmony with the preferential embodiment described, the present invention also relates to a method for operation acoustic optimization a variable speed compressor 2 comprising a synchronous motor 6, the compressor 2 being electrically associated with a frequency inverter 3 and a control block 5, the method being characterized by comprising the following steps:

(a) establishing a first switching frequency F1;
(b) establishing a second switching frequency F2;
(c) establishing a time period T1, which corresponds to the duration of the alignment operation of the synchronous motor 6;
(d) supplying the synchronous motor (6) with a signal (9) with the first switching frequency (F1) established in step (a), during the time period T1 established in step (c); and
(e) after the time period T1 established in step (c), supply the synchronous motor (6) with a signal (9) with the second switching frequency F2 established in step (b).

Thus, and in harmony with the information previously described, the control block 5 is configured to perform steps (a), (b) and (c), while steps (d) and (e), referring to a power supply to the motor 6 of the compressor 2 with the set frequency switching F1, F2, is performed by the frequency converter 3.

In addition, referring to step (a), a first switching frequency F1 is established, such first switching frequency F1 having, preferably, a value higher than 12 kHz. Most preferably, the first switching frequency F1 has a value higher than 20 kHz.

Referring to step (b), a second switching frequency F2 is established, said second switching frequency F2 having a value in the range of 20 Hz to 20 kHz. Preferably, the second switching frequency F2 has a value of 5 kHz.

Additionally, referring to step (c), the established time period T1, which corresponds to at least an alignment operation of the motor 6, can correspond to multiple alignment operations of the motor 6.

Finally, and in harmony with the information previously described, the present invention also relates to a refrigerator that comprises a system for acoustic optimization as previously described.

Advantageously, the present invention provides means to eliminate the noise generated by a variable speed compressor 2 during the alignment phase of the motor 6, not impairing the performance of compressor 2 or the thermal management of the frequency inverter 3. This is because, during the alignment of the motor 6, a first switching frequency F1 of the motor 6 is established, which has a value in the range of frequencies not audible, or barely perceptible, to humans. After such alignment, a second switching frequency F2 is used, with a value lower than the first switching frequency F1 and established in order to obtain an optimal performance of the compressor 2 and ensure the thermal management of the inverter 3.

Thus, only during the alignment phase, the compressor 2 will operate with a switching frequency that is not established and directed to obtain an optimal performance and, as it is a transitory phase, it does not have a significant impact on thermal management inverter 3. During the remaining operation of the compressor 2, in which a signal 9 with the second switching frequency F2 powers the motor 6, the performance of compressor 2 and the thermal management of the inverter 3 will be prioritized when establishing this second frequency F2.

Considering the described example of a preferential embodiment, it should be understood that the scope of the present invention covers other possible variations, being limited only by the scope of the appended claims.

The invention claimed is:

1. A system for operational acoustic optimization of a variable speed compressor (2), the system comprising a variable speed compressor (2) that comprises a synchronous motor (6), a frequency inverter (3) and a control processor (5);
   the frequency inverter (3) being electrically connected to the synchronous motor (6) and an electrical network (4);
   the control processor (5) being electrically connected to the frequency inverter (3) and being configured to control the speed of the synchronous motor (6) included in the variable speed compressor (2);
   wherein the control processor (5) is further configured to establish a first switching frequency (F1) and a second switching frequency (F2) of the frequency inverter (3) to supply the synchronous motor (6) with a power supply signal (9), whereby the first switching frequency (F1) is located in a region of the frequency spectrum that is higher than 20 kHz or in a non-audible region of the frequency spectrum;
   the control processor (5) being configured to further establish a time period (T1) in which the synchronous motor (6) will be fed by the frequency inverter signal (3) with the first switching frequency (F1);
   wherein
      the time period (T1) corresponds to at least one alignment operation period of the motor (6);
      the frequency inverter (3) being configured to start the variable speed compressor (2) by supplying motor (6) with a signal (9) with the first switching frequency (F1) for the duration of the time period (T1); and
      the frequency inverter (3) being further configured to supply the motor (6) with a signal (9) with the second switching frequency (F2) after the time period (T1).

2. The system for operational acoustic optimization of a variable speed compressor (2) according to claim 1, wherein the second switching frequency (F2) has a value in the range of 20 Hz to 20 kHz.

3. The system for operational acoustic optimization of a variable speed compressor (2) according to claim 2, wherein the second switching frequency (F2) has a value of 5 kHz.

4. The system for operational acoustic optimization of a variable speed compressor (2) according to claim 1, wherein an alignment phase of the motor (6) comprises at least one alignment operation of the motor (6) with a time period (T1).

5. The system for operational acoustic optimization of a variable speed compressor (2) according to claim 4, wherein the alignment phase of the motor (6) comprises multiple alignment operations of the motor (6).

6. A method for operational acoustic optimization of a variable speed compressor (2) comprising a synchronous motor (6), the compressor (2) being electrically associated with a frequency inverter (3) and a control processor (5); the method comprising:
   (a) establishing a first switching frequency (F1), whereby the first switching frequency (F1) is located in a region of the frequency spectrum that is higher than 20 kHz or in a non-audible region of the frequency spectrum;
   (b) establishing a second switching frequency (F2);
   (c) establishing a time period (T1), which corresponds to the duration of at least one aligning operation of the synchronous motor (6);
   (d) starting the variable speed compressor (2) by supplying the synchronous motor (6) with a signal (9) with the first switching frequency (F1) established in step (a), during the time period (T1) established in step (c); and
   (e) after the time period (T1) established in step (c), supply the synchronous motor (6) with a signal (9) with the second switching frequency (F2) established in step (b).

7. The method for operational acoustic optimization of a system comprising a variable speed compressor (2) according to claim 6, wherein the steps (a), (b), and (c) are performed by the control processor (5).

8. The method for operational acoustic optimization of a system comprising a variable speed compressor (2) according to claim 6, wherein the steps (d) and (e) are performed by the frequency inverter (3).

9. The method for operational acoustic optimization of a system comprising a variable speed compressor (2) according to claim 6, wherein the time period (T1) established in step (c) corresponds to multiple alignment operations of the motor (6).

10. The method for operational acoustic optimization of a system comprising a variable speed compressor (2) according to claim 6, wherein the second switching frequency (F2) has a value in the range of 20 Hz at 20 kHz.

11. The method for operational acoustic optimization of a system comprising a variable speed compressor (2) according to claim 6, wherein the second switching frequency (F2) has a value of 5 kHz.

12. A refrigerator comprising the system of claim 1.

* * * * *